United States Patent Office 2,863,647
Patented Dec. 9, 1958

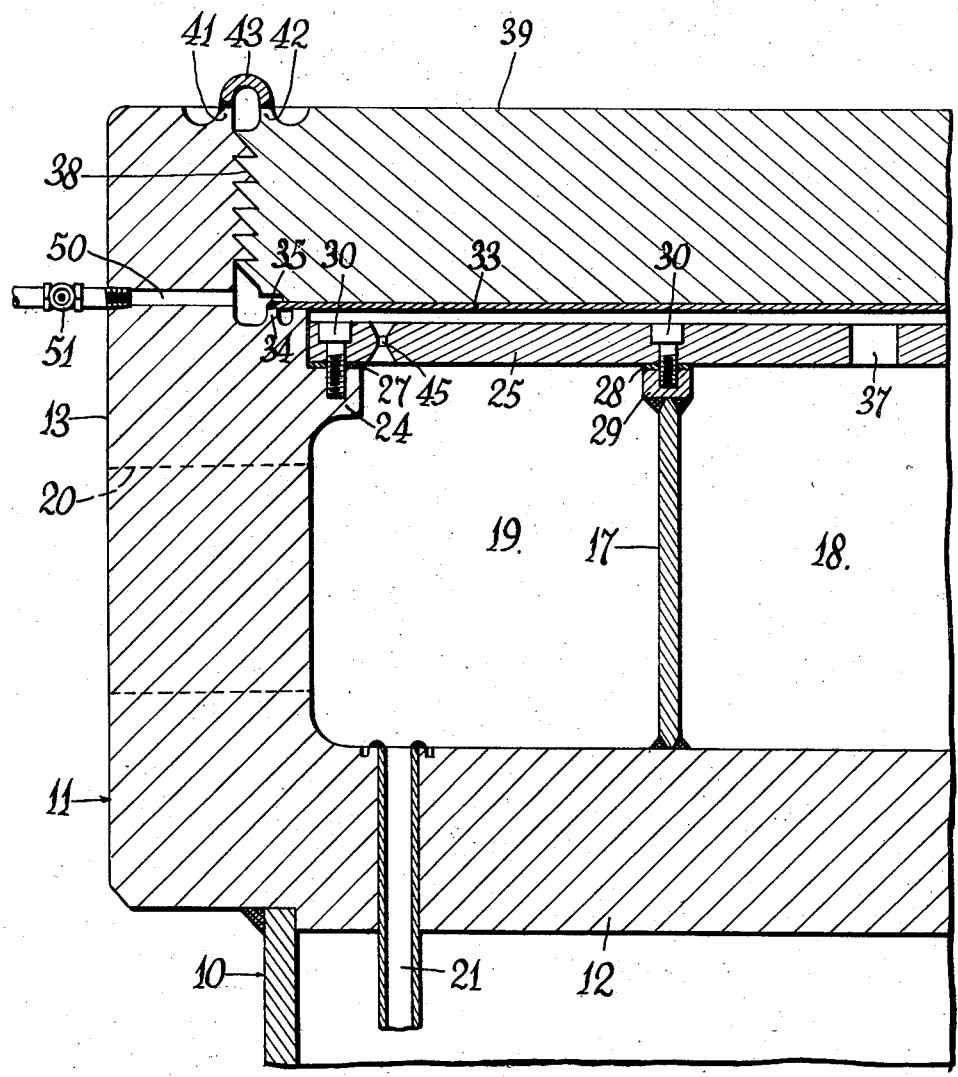

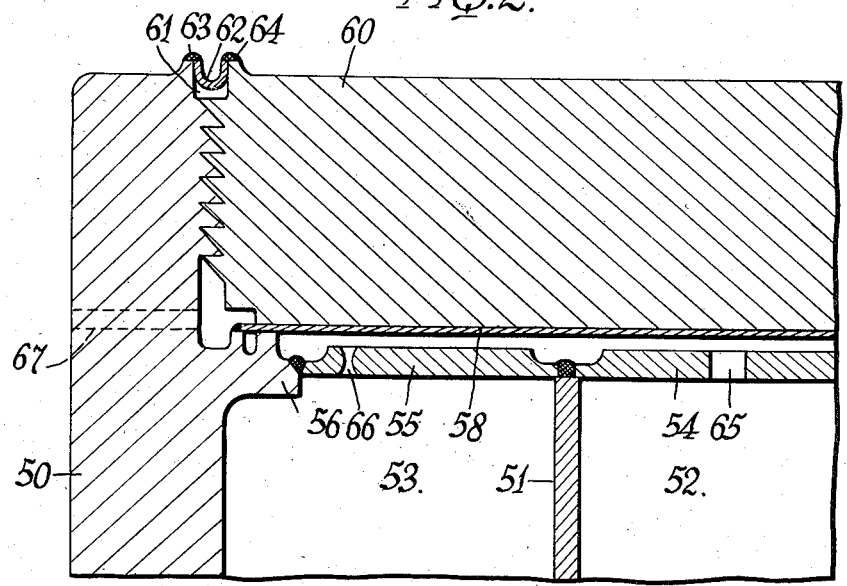
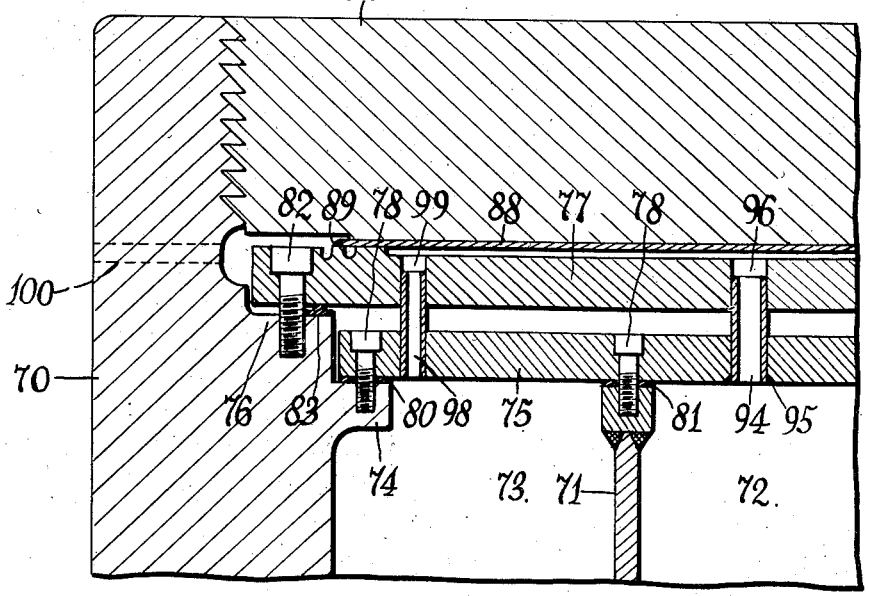

2,863,647

HIGH PRESSURE CLOSURE

Townsend Tinker, Orchard Park, N. Y., assignor to American Radiator & Standard Sanitary Corporation, New York, N. Y., a corporation of Delaware Application December 2, 1955, Serial No. 550,646

6 Claims. (Cl. 257—221)

This invention relates to closures for pressure vessels and more particularly to closure members or cover means for high pressure heads of heat exchangers and similar apparatus.

The problem of providing an adequate seal for vessels which are subject to high internal pressures, by means of removable closure heads or cover devices, presents many problems and has been the subject of much research and experimentation. The extremely high internal pressures encountered in present day pressure vessel design presents a considerable problem in maintaining an adequate seal and transmitting and distributing the stresses incident to such high pressure operating conditions. This problem is further complicated by the stresses and strains resulting from rapid temperature changes such as when a unit is thrown into operation abruptly in emergencies or when there is a sudden load increase, such as in large power plant operations.

A type of high pressure closure which is desirable from many standpoints is one wherein the fluid seal means is more or less independent of the structural load-bearing portion of the closure means, so that the main hydrostatic pressure load against the latter does not act against or strain the fluid seal means. This general type of closure means usually contemplates multiple closure members wherein, speaking generally, an inner closure member provides a hermetic seal against leakage and a separate outer closure member bears the hydrostatic load applied to the closure means by the internal fluid pressure forces in the vessel.

Closure devices which employ various forms of the foregoing multiple closure arrangement are subject to the objection that they form stagnant areas wherein liquid or other heat exchange fluid is trapped in normal operation and which act as insulating layers or thermal barriers.

In the form of closure shown herein by way of example a flexible diaphragm transmits the hydrostatic pressure load to the outer cover member and a plate lying just inwardly of the diaphragm to back up the same and seal the same with respect to the vessel interior is provided with passage means to equalize pressure at opposite sides of the backup plate or, in other words, to cause the same pressure to bear outwardly against the diaphragm as is present in the vessel interior. It is the space between the diaphragm and the backup plate which thus becomes a stagnant insulating area in prior closures of this type. Further, where separate pass rib covers are employed a similar stagnant area may lie between such pass rib cover plate and the diaphragm backup and sealing plate.

In modern power generating installations the cycle pressures and operating temperatures of the boilers, turbines and bleeder heaters have reached a point where pressures in excess of 3000 pounds per square inch and 800° F. are not uncommon. In such installations failure of a large unit or a sudden load increase often necessitates the rapid emergency starting of another large unit. Such sudden starting with its attendant rapid temperature changes and resulting structural strain due to uneven rates of expansion may produce unsafe and hazardous conditions until the large structures involved have reached uniform operating temperatures.

This hazardous condition is greatly aggravated by any stagnant fluid areas or insulating thermal barriers such as those described above. The outer cover is prevented from reaching a proper operating temperature while the structure which the outer cover engages, such as the main channel wall of the vessel, quickly reaches its operating temperature by way of the continuous and relatively large metallic conducting path thereto from the body of the vessel. Thus the outer cover and its supporting and engaging means no longer fit properly and the resultant deflection, deformation, localized stresses and forced readjustments produce highly undesirable conditions.

The present invention provides limited flow or fluid circulation means between the vessel interior and these stagnant areas to nullify their insulating effect and cause a degree of heat transfer therethrough of the same general order as the heat transfer through the wall around the closure members, thus avoiding or at least minimizing the stress and strain engendered by unequal expansion and contraction of the parts due to rapid temperature change in the fluid within the vessel.

Several embodiments of the principles of the present invention are illustrated in the accompanying drawings and described in the following specification by way of example. However, it is to be understood that the present invention is not limited thereto or otherwise than as defined in the appended claims.

In the drawings:

Fig. 1 is a fragmentary cross-sectional view taken longitudinally through a corner of a pressure vessel provided with one form of the closure of the present invention;

Fig. 2 is a similar view of another embodiment of the closure of the present invention; and Fig. 3 is a similar view of a still further embodiment of the closure of the present invention.

In the case of all three embodiments the drawings illustrate what may be considered to be the upper left-hand corners of vertically extending cylindrical pressure vessels. Reference will first be had to the form of the present invention illustrated fragmentarily in Fig. 1.

In Fig. 1 the numeral 10 designates a fragmentary upper corner portion of a main hollow cylindrical body member and a head member welded to the upper end thereof is designated generally by the numeral 11. The head member 11 comprises a radial wall portion 12 which in the present instance comprises a tube sheet for a tube type heat exchanger. The head member 11 further includes a cylindrical portion 13 which extends axially outwardly from the pressure vessel proper (upwardly as viewed in Fig. 1). A conventional pass plate or pass rib 17 is welded within the interior of head member 11 and divides the same into an inlet pass portion 18 and an outlet pass portion 19. An outlet passage is indicated at 20 in Fig. 1 and a similar inlet passage is provided at the opposite side of head member 11.

Pressure fluid such as high pressure water or superheated steam enters the inlet pass portion 18 and passes to the outlet pass portion 19 by way of a plurality of tubes which are fixed in tube sheet 12 in conventional manner. Merely by way of example the numeral 21 in Fig. 1 designates one of the heat exchange tubes of the apparatus. All of the foregoing is generally conventional construction in high pressure heat exchanger vessels of this general class and is well known to those skilled in the art to which the present invention relates.

Adjacent to the upper or outer end of the inlet and outlet pass portions 18 and 19, the interior of head member 11 is provided with an internal flange or annular rib formation 24 which provides an annular seat or ledge for a backup plate or inner cover member 25. In the present instance backup plate 25 also comprises a pass rib sealing cover to cooperate with pass rib 17 in dividing or separating inlet pass portion 18 and outward pass portion 19.

Inner cover member 25 seats on the ledge of flange 24 through the medium of a sealing gasket 27 and a similar sealing gasket 28 is interposed between inner cover 25 and an enlargement 29 formed at the upper edge of pass plate or pass partition 17. Screws 30 pass through inner cover member 25 and the underlying gaskets and screw into ledge 24 and enlargement 29 of the pass partition 17 to retain the inner cover member and apply proper sealing pressure to the gaskets.

A diaphragm 33 overlies inner cover member 25 and is welded or brazed about its margin to an annular flange 34 formed on flange 24 of head member 11, as at 35. One or more openings 37 in inner cover member 25 establish equal hydrostatic pressures above and below the inner cover member at the inlet pass portion side of the head member 11. Accordingly, the inner cover member and its gasket means provide a fluid seal as between inlet pass portion 18 and outlet pass portion 19 without bearing any portion of the major hydrostatic pressure load within the vessel generally and the pass portions in head member 11. Diaphragm 33 and its marginal weld connection 35 with flange 34 of head member 11 provide a hermetic seal for the head space comprising the inlet and outlet pass portions and the space both above and below the inner cover member 25.

The interior of cylindrical portion 13 of the head member 11 outwardly of flange 24 is provided with internal buttress threads as at 38 in Fig. 1 and a rigid outer cover member 39 is peripherally threaded to engage the internal threads 38. Outer cover member 39 is screwed into such position that its inner radial face substantially abuts the upper surface of diaphragm 33. It will be noted that this threaded connection of outer cover member 39 is outside of and protected from the pressure fluid in the vessel by the hermetic seal formed by diaphragm 33 and its welded or brazed connection 35.

A secondary hermetic seal is provided at the outer margin of outer cover member 39. As shown in Fig. 1, an axially outwardly extending annular flange 41 is formed on head member 11 and companion flange 42 is formed at the outer margin of outer cover member 39. A channel-shaped sealing ring 43 is welded at its opposite terminal edges to the flanges 41 and 42 to bridge the same and provide a hermetic seal over the threaded engagement between the outer cover member 39 and the outer end of head member 11.

A restricted passage 45 in the nature of a metering orifice is provided in inner cover member 25 leading from the space thereabove to the outlet pass portion 19 of the head space. In the present instance orifice 45 is preferably located relatively remotely from the inlet pass portion side of head member 11. There is a necessary and permissible pressure drop from the inlet pass portion side to the outlet pass portion side due to the fluid friction in the heat exchange tubes and fluid will flow, in normal operation of the apparatus, from inlet pass portion 18 through pressure equalizing passage 37, along the space between diaphragm 33 and inner cover member 25, and thence through metering orifice 45 to outlet pass portion 19.

This fluid flow is not sufficient to affect the overall efficiency of the heat exchanger or similar apparatus to any material degree but produces a sufficient fluid circulation through the space between diaphragm 33 and inner cover member 25 to negative the insulating tendency or thermal barrier effect of this space and promote rapid temperature equalization as between the inner and outer cover members.

The fluid flow thus induced is sufficient to render the temperature response or heat transfer to the outer cover member through the inner cover member and the diaphragm of substantially the same degree as the temperature flow through the main channel wall comprising the cylindrical portion 13 of head member 11. Accordingly, temperature changes produce temperature waves through these two paths that progress substantially in unison so that the meeting retaining parts at the outer end of the apparatus are always at substantially the same temperatures or temperatures which are sufficiently equal to avoid any harmful stresses due to unbalanced temperatures and unequal expansion.

The supplementary external seal provided by the welded channel ring 43 provides added assurance against shutdown from seal leakage or failure. In the normal operation high pressure will be applied only to the inner diaphragm seal and a tell-tale outlet or drain passage 50 leading to the space below the buttress threads 38 will be open. In case of inner seal leakage and consequent flow through the tell-tale passage, a valve 51 therein will be closed so that the secondary outer seal will maintain the hermetically sealed condition of the vessel until it can be conveniently taken out of service for inspection and repair.

The modification shown in Fig. 2 is a slightly modified form of closure device which is adapted to function in the same manner as the preceding embodiment as to the avoidance of insulating layer or thermal barrier effects and which also provides a secondary welded seal at the outer face of the outer cover member. The portions of the closure of Fig. 2 which are not illustrated or described are the same as in the preceding embodiment.

A head member similar to that of the previous embodiment is fragmentarily indicated at 50 in Fig. 2 and a pass partition plate 51 divides the head space into an inlet pass portion 52 and an outlet pass portion 53.

In the present embodiment the means which serve as a pass sealing cover and also as a backup plate for the pressure transferring diaphragm comprises a pair of semicircular plates 54 and 55 which are welded to pass partition 51 and to a ledge or internal flange 56 provided in the head member 50. A diaphragm 58 is welded or brazed to ledge 56 about its margin as in the previous embodiment and an outer cover member 60 is threaded into the outer end of head member 50 with the inner radial face thereof substantially in abutment with the outer face of diaphragm 58.

In the present embodiment the outer juncture of the outer cover member 60 and the associated end of head member 50 are formed to provide a channel 61 and a channel-shaped sealing ring 62 fits within channel 61 and is welded at its opposite terminal edges to the head member 50 and outer cover member 61 as at 63 and 64, respectively. In the present embodiment the pressure equalizing passage between the inlet pass portion of the head space and the space above the inner cover members 54 and 55 is designated 65 and a metering orifice 66 is formed in inner cover member 55 to provide fluid circulation through the space between the inner cover members 54 and 55 and diaphragm 58, just as in the previously described embodiment. A valve-controlled tell-tale drain passage 67 is also provided as in the preceding embodiment.

In the modification illustrated in Fig. 3 the pass seal cover and the gasket sealing plate, the latter serving as a mounting means and backup means for the diaphragm, are separate independently removable elements. In Fig. 3 the numeral 70 designates a heat exchanger head member similar to that of the preceding embodiments, a pass partition member 71 being provided for dividing the interior of head 70 into inlet and outlet pass portions designated 72 and 73, respectively.

An internal flange 74 in head 70 provides a ledge for receiving a pass seal cover 75 and a further more outwardly disposed ledge formation 76 provides a seat for a gasket sealing plate 77. Pass seal cover 75 is secured to internal flange 74 and the upper edge of pass partition 71 by screws 78, there being intervening gasket means designated 80 and 81, respectively.

Gasket sealing plate 77 is detachably secured to ledge 76 by screws 82 and a gasket seal member 83 is disposed between the gasket sealing plate and its seat on ledge 76. A flexible diaphragm 88 is attached to an annular flange formation 89 on gasket sealing plate 77 as by welding or brazing and an outer cover member 90 is threaded into the outer end of head member 70 with its inner radial face in abutment with the outer face of flexible diaphragm 88.

To establish a balanced pressure condition of the gasket sealing plate 77, so that the seal effected thereby through sealing means 83 is not subject to the hydrostatic pressure load of the vessel, a pressure equalizing passage to the space between gasket sealing plate 77 and diaphragm 88 is provided. In the form shown in Fig. 3 a nipple 94 carried by pass seal cover 75 and preferably welded or brazed thereto as at 95, fits snugly within an opening 96 in gasket sealing plate 77. In this manner the pressure within the inlet pass portion 72 of the apparatus is communicated to the space above gasket sealing plate 77.

To provide the temperature equalizing fluid flow effect of the present invention in the arrangement of Fig. 3, a further relatively small diameter nipple or orifice tube 98 is attached to pass seal cover 75 as by welding or brazing and fits snugly within an opening 99 in gasket sealing plate 77. Flow from inlet pass portion 72 through nipple 95, across the space between gasket sealing plate 77 and diaphragm 88 and through nipple 98 to the outlet pass portion 73 takes place just as in the preceding embodiments and for the same purpose of insuring relatively rapid heat transfer to the outer cover member 90. In Fig. 3 a valved tell-tale drain passage 100 leading from the space below outer cover 90 is preferably also provided.

I claim:

1. In a high pressure closure for vessels, a head member having inlet and outlet chambers, a cover member for said chambers, an outer cover member and means acting between the outer cover member and said vessel to transmit outward pressure forces acting against the outer cover member to said vessel, and a diaphragm between said cover members and abutting the inner surface of the outer cover member, said inner cover member having an opening therethrough at said inlet chamber whereby substantially equal fluid pressures prevail in said inlet chamber and between the first cover member and the diaphragm, and a relatively restricted opening in said inner cover member at said outlet chamber to establish a restricted fluid flow in the space between said cover members from the first mentioned opening to said relatively restricted opening.

2. In a high pressure closure for vessels, a head member having inlet and outlet chambers, a cover member for said chambers, an outer cover member and means acting between the outer cover member and said vessel to transmit outward pressure forces acting against the outer cover member to said vessel, and a diaphragm between said cover members peripherally sealed to the interior of said head and abutting the inner surface of the outer cover member, said inner cover member having openings therethrough at said inlet and outlet chambers whereby substantially equal fluid pressures prevail in said chambers and in the space between the first cover member and the diaphragm and whereby a fluid flow is established in the space between said cover members from one of said openings to the other.

3. In a high pressure closure for vessels, a head member having inlet and outlet chambers, a cover member for said chambers, an outer cover member and means acting between the outer cover member and said vessel to transmit outward pressure forces acting against the outer cover member to said vessel, and a diaphragm between said cover members peripherally sealed to the interior of said head and abutting the inner surface of the outer cover member, said inner cover member having an opening therethrough at said inlet chamber whereby substantially equal fluid pressures prevail in said inlet chamber and between the first cover member and the diaphragm, and a relatively restricted opening in said inner cover member at said outlet chamber to establish a restricted fluid flow in the space between said cover members from the first mentioned opening to said relatively restricted opening.

4. In a high pressure closure for vessels, a head member having inlet and outlet chambers, a cover member for said chambers, an outer cover member and means acting between the outer cover member and said vessel to transmit outward pressure forces acting against the outer cover member to said vessel, and a peripherally sealed diaphragm between said cover members and abutting the inner surface of the outer cover member, said inner cover member having openings therethrough at said inlet and outlet chambers whereby substantially equal fluid pressures prevail in said chambers and in the space between the first cover member and the diaphragm and whereby a fluid flow is established in the space between said cover members from one of said openings to the other.

5. In a closure for vessels containing high pressure fluid subject to substantial temperature variations, a head member having inlet and outlet chambers, a cover member for said chambers, an outer cover member and means acting between the outer cover member and said vessel to transmit outward pressure forces acting against the outer cover member to said vessel, and a peripherally sealed diaphragm between said cover members and abutting the inner surface of the outer cover member, said inner cover member having an opening therethrough at said inlet chamber whereby substantially equal fluid pressures prevail in said inlet chamber and between the first cover member and the diaphragm, and a relatively restricted opening in said inner cover member at said outlet chamber to establish a restricted fluid flow in the space between said cover members from the first mentioned opening to said relatively restricted opening.

6. In a closure for vessels containing high pressure fluid subject to substantial temperature variations, a head member having inlet and outlet chambers, a cover member for said chambers, an outer cover member and means acting between the outer cover member and said vessel to transmit outward pressure forces acting against the outer cover member to said vessel, and a peripherally sealed diaphragm between said cover members and abutting the inner surface of the outer cover member, said inner cover member having an opening therethrough whereby substantially equal fluid pressures prevail at opposite sides of said inner cover member, and a relatively restricted opening in said inner cover member spaced laterally from the first mentioned opening to establish a restricted fluid flow in the space between said cover members from the first mentioned opening to said relatively restricted opening.

References Cited in the file of this patent

UNITED STATES PATENTS

| | | |
|---|---|---|
| 2,009,877 | Dodd | July 30, 1935 |
| 2,219,659 | Price | Oct. 29, 1940 |
| 2,247,105 | Tinker | June 24, 1941 |
| 2,711,266 | Kopp | June 21, 1955 |